March 13, 1951 DE WITT McCANN 2,544,799
YIELDING VEHICLE STEP

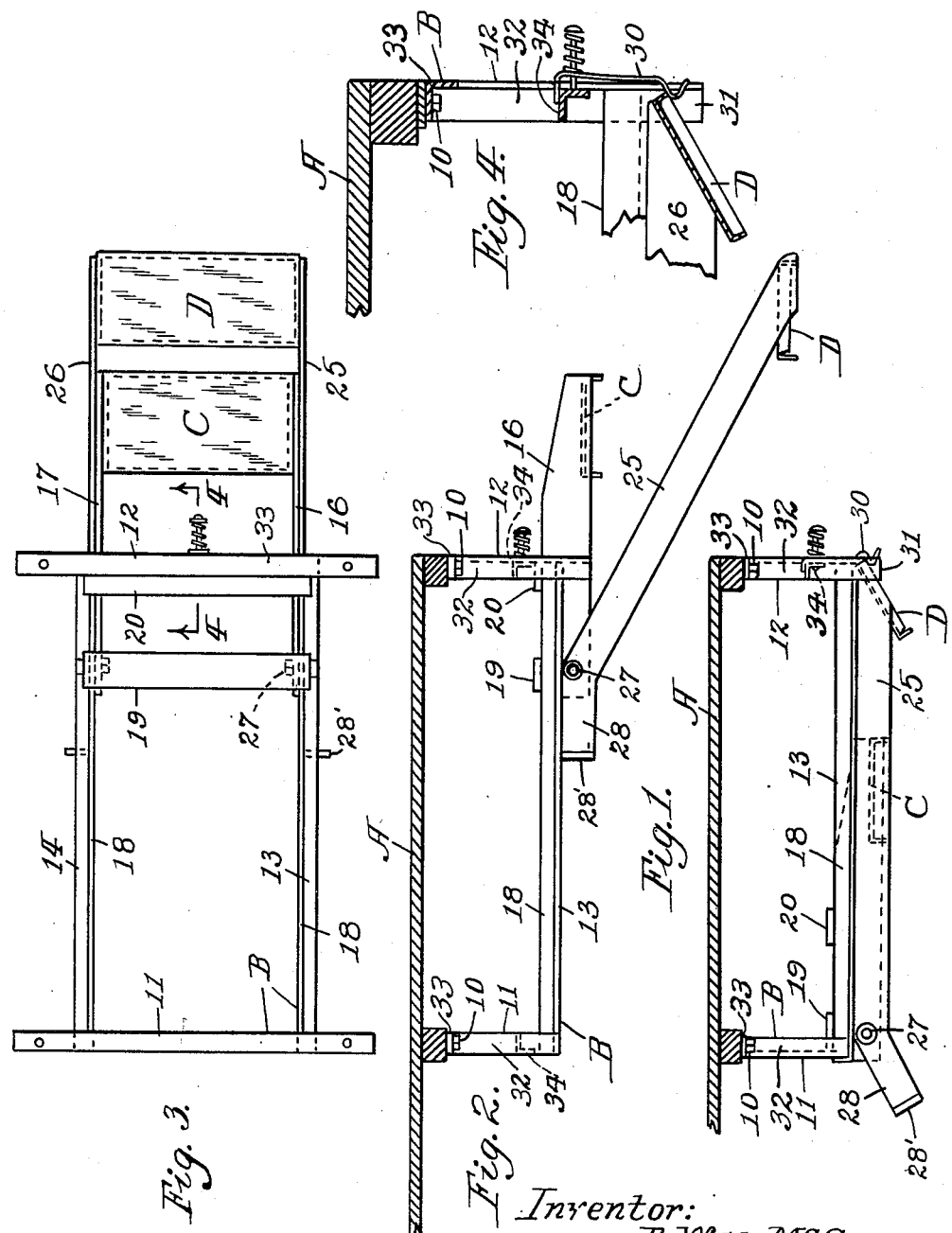

Filed March 3, 1947 2 Sheets-Sheet 2

Inventor:
DeWitt McCann,
by: T. G. Bradbury
Attorney.

Patented Mar. 13, 1951

2,544,799

UNITED STATES PATENT OFFICE 2,544,799

YIELDING VEHICLE STEP

De Witt McCann, Los Angeles, Calif.

Application March 3, 1947, Serial No. 731,973

4 Claims. (Cl. 280—167)

This invention relates to a yielding vehicle step structure for use on trucks, trailers and other types of vehicles, wherein said structure may be extended into operative position or folded out of the way when not used.

More particularly my improvement is directed to improved means by which the step when extended and unfolded into operative position beyond one side or end portion of a vehicle body will yield automatically and recede into safe retracted position if the step structure accidentally strikes or is struck by an obstacle of any sort, such as a curb, side of a building, another vehicle, and the like. For instance, when the step is unfolded and extended forwardly into operative position and if the vehicle upon which the step is mounted and used causes the step to strike a street curb or other object, the step will thereupon yield and recede automatically, thereby avoiding damage to the step structure or the object which it strikes.

This invention is an improvement of the structure contained in my Patent No. 2,487,660, issued November 8, 1949.

Among further objects and advantages is the production of a step structure which is compact, simple in construction, and highly effective in use. To these ends this invention comprises the features of construction and combination of parts hereinafter described and claimed.

Figure 5:
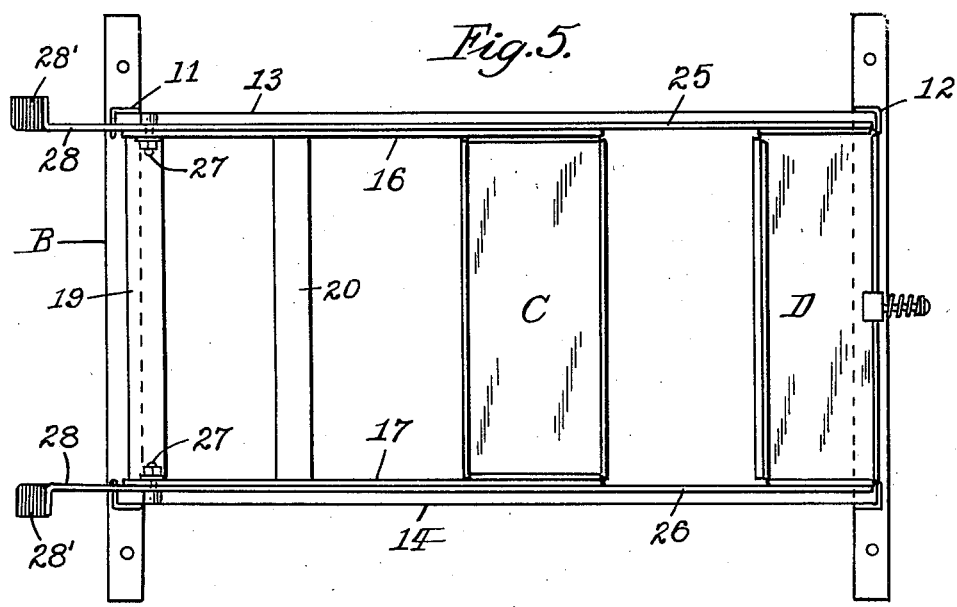
Figure 6:
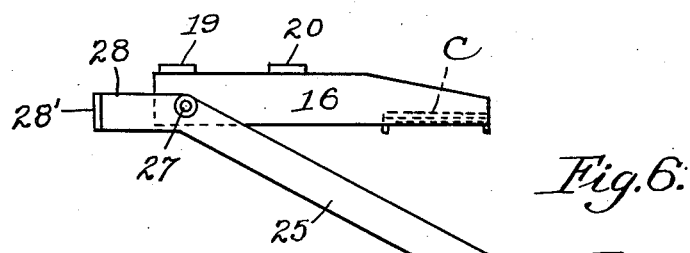
Figure 7:
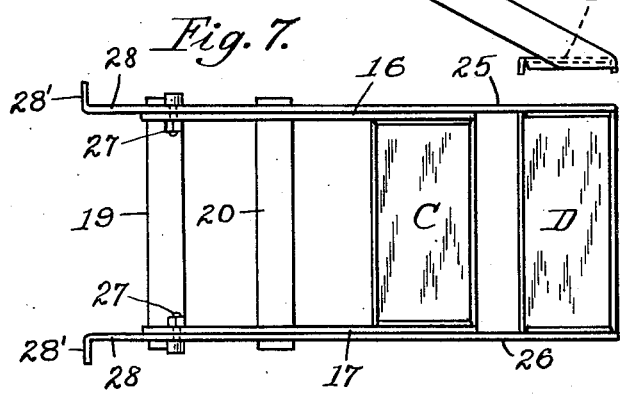

In the accompanying drawings forming part of this specification, Fig. 1 is a side elevation showing my improved step structure collapsed or folded in its receded or rearward position below a portion of a vehicle body, the latter being shown in section and representing either a side or end portion thereof; Fig. 2 is a view similar to Fig. 1 showing the step structure extended forwardly or unfolded ready for use; Fig. 3 is a plan of the step structure as shown in Fig. 2 when removed from the body of the vehicle; Fig. 4 is a section at increased scale taken on the line 4—4 of Fig. 3 when the step structure is receded in the carrier frame and the step D is retained in raised position; Fig. 5 is a bottom plan of my improved step device at increased scale looking up at the structure as shown in Fig. 1, when removed from the body of the vehicle; Fig. 6 is a side elevation of the upper and lower step structures as shown in Fig. 2, when removed from the frame in which they are slidably and foldably supported; and Fig. 7 is a bottom plan of the structure shown in Fig. 6.

In the drawings A represents a portion of the floor of a vehicle body of any suitable construction and which may represent the rear end or side portion thereof. To the bottom of said floor is rigidly secured at 10 by bolting, riveting or other suitable means, a skeleton carrier frame B. The carrier frame has two substantially similar forward and rearward, vertical depending transverse rectangular brackets 11 and 12. Each of these brackets 11 and 12 has a pair of vertical side arms 32, an upper transverse angle member 33 which is tied to said side arms, and a lower transverse angle member 34 which is also tied to said side arms. The mode of connecting the above members is by welding or other suitable means. In this manner each bracket is reinforced and provides a rigid skeleton support on the lower surface of the vehicle floor. The brackets 11 and 12 support a pair of horizontal and longitudinal angle track rails 13 and 14 which are fastened to and extend between the lower portions of said brackets. The track rails are secured by welding or other suitable means to said brackets and together produce a rigid frame with the track rails preferably lying in a horizontal plane and extending forwardly and outwardly below the body floor of the vehicle either below the side or end portion according to which position the step structure is used. The forward bracket member 12 of the carrier frame B is preferably located in proximity below the outer edge portion and the rearward bracket is placed below the median portion of the body floor A of the vehicle. Said outer edge portion may represent the rear end or side edge of the vehicle body of any type.

My improvement provides two upper and lower step treads C and D which are movable into either receded or upwardly folded condition below the body floor A as shown in Fig. 1 or into outwardly projected and downwardly extended position to produce a flight of two steps as shown in Fig. 2, in which latter position the user is assisted in mounting or alighting from said body and particularly when the latter is comparatively high above the ground surface. My improvement further provides a step structure of the type stated which is freely yieldable and free to recede horizontally below the body floor in case the step structure is accidentally struck by or strikes an object, thereby avoiding damage thereto or to the object which it strikes. To these ends the upper tread C is rigidly secured longitudinally by welding or other suitable means transversely between a pair of laterally spaced parallel slides 16 and 17 which are placed on edge and slide closely between the inner flanges 18 of the parallel track rails 13 and 14. A pair of transverse spacing bars 19 and 20 are secured by welding or other suitable means across the upper edges and rearward end portions of the slides and cooperate with the step tread C in forming a rigid step supporting slide frame. The outer end portions of the transverse spacing bars 19 and 20 rest and slide on the upper edges of the flanges 18 of the track rails 13 and 14. The width vertically of the slides 16 and 17 is greater than the height of the track rails so as to hang a short distance below the latter as hereinafter set forth. The spacing bars 19 and 20 are positioned forwardly and rearwardly across the track rails 13 and 14 a sufficient distance laterally apart so as to form stops across the vertical side members of the forward and rearward brackets 11 and 12, whereby the step tread C may slide outwardly a suitable distance into step forming position beyond the body floor A as shown in Fig. 2, or inwardly into receded position below the body floor within or approximately even with the outer edge portion of the body floor as shown in Fig. 1.

The lower tread D is rigidly secured by welding or other suitable means in horizontal position when extended to the outer end portions of a pair of parallel supporting arms 25 and 26. In extended position these arms extend downwardly at an angle and are evenly spaced apart. The rearward ends of the supporting arms 25 and 26 are secured by pintle connections 27 on the lower edge portions of the slides 16 and 17 below the rails 13 and 14. Both the slides 16 and 17 and supporting arms 25 and 26 are freely movable longitudinally on the outer sides of the rails 13 and 14. The rearward end portions of the supporting arms 25 and 26, beyond the pintle connections 27 are formed with short lower stop extensions 28 which are set at an angle to the supporting arms and which in conjunction with laterally projecting flanges 28' impress themselves against the lower surfaces of the track rails and function as supports to retain arms 25 and 26 at outwardly and downwardly inclined position and support the tread D in relatively horizontal position. In this manner the lower tread D cooperates with the upper tread C in forming a suitable flight of steps below and beyond the outer edge portion of the vehicle floor. The pintle connections 27 hinge the supporting arms 25 and 26 so that the latter may be folded upwardly along side to the outer surfaces of the slides 16 and 17. In upwardly folded position the upper tread is slid rearwardly within the carriage frame A with its spacing bar 19 functioning as an inner stop against the inner bracket 11 as above described. Following this movement the forward end portions of the supporting arms 25 and 26 bearing the lower tread D are swung up into raised horizontal position against the lower side surfaces abutting the lower surfaces of the horizontal rails 13 and 14. In this position the forward edge of the tread D is adapted to be engaged by a spring actuated catch 30 (Fig. 4) and the forward ends of the supporting arms 25 and 26 engage back of a pair of lower extensions 31 on the vertical side members of the bracket 12, whereby the step members and slides are positively held in folded position in the carrier frame.

When it is desired to use the steps the tread D is first disengaged from the catch 30 and swung down. The tread is next slid forwardly until the spacing bar 20 strikes the side members of the forward bracket 11. The tread D is next swung downwardly into extended outermost position as shown in Fig. 2. In this position the user may easily mount or dismount from the vehicle body. While thus extended in the event the flight of steps strikes or is struck by an object it is free to recede inwardly without being damaged and when returned and folded inwardly and upwardly it assumes a position which is substantially out of harm's way.

It is understood that the appended claims are to be accorded a range of equivalents commensurate in scope with the advance made over the prior art.

I claim:

1. A freely yieldable and extendable flight of steps for a vehicle body, comprising a carrier frame adapted to be secured below and having a track directed outwardly on said body, a slide structure movably mounted on said track and adapted to travel outwardly and inwardly below said body, an upper step tread on the outer end portion of said slide structure adapted to be extended from said body in the outward position assumed by the slide structure, a supporting arm structure having its inward end portion hinged to swing up and down on said slide structure, a lower step tread on the outward end portion of said supporting arm structure, said supporting arm structure being free to swing with the lower arm structure upwardly upon the slide structure when out of use or downwardly with the lower step tread assuming lower extended operative position below the upper step tread when the slide structure is in its outward position on said track, and stop means interposed between said slide and arm members for retaining the lower step supporting arm structure when lowered and assuming operative position.

2. In a structure as defined in claim 1, manually releasable fastener means between the forward end portions of said carrier frame and lower step tread supporting arm structure, adapted to hold said slide and supporting step structure in receded and raised position in said carrier frame.

3. A freely yieldable and extendable flight of steps for a vehicle body, comprising a carrier frame adapted to be secured below said body having an outwardly directed track, a slide freely movable outwardly and inwardly on said track having a step tread on its outer end portion which is projectable from and retractable below the body by said slide, and a lower step supporting arm structure mounted upon said slide, normally extendable outwardly below the upper step tread and freely yieldable with said slide inwardly below the vehicle body on said carrier frame when meeting an outward obstruction.

4. A recedable flight of steps for a vehicle body, comprising a carrier frame adapted to be supported below an edge portion of said body and having forwardly extending track rails, a slide structure reciprocably mounted on said rails having an upper step tread on its forward end portion adapted to assume a position forwardly beyond said carrier frame or to recede rearwardly in said frame below said body, a lower step structure having arms hinged near their rearward end portions on said slide structure and provided with a lower step tread on their forward end portions, said arms in the forward position of said slide structure being adapted to tilt down on their supports with said lower step tread assuming step forming position and to swing upwardly when said slide structure assumes rearward position in said frame, stop means on the rearward ends of said arms bearing against the frame for sustaining said arms in lowered position, and means for releasably fastening said slide structure with said arms raised in said carrier frame, said slide structure together with said lower step structure being freely yieldable by sliding movement on said track rails inwardly below the vehicle body when extended and meeting an outer obstruction.

DE WITT McCANN.

REFERENCES CITED

The following references are of record in the file of this patent:

UNITED STATES PATENTS

| Number | Name | Date |
|---|---|---|
| 2,145,647 | Evans | Jan. 31, 1939 |
| 2,149,296 | Kelberer | Mar. 7, 1939 |
| 2,153,945 | Thelander | Apr. 11, 1939 |
| 2,279,329 | King | Apr. 14, 1942 |